April 9, 1968  N. A. KJELSON  3,377,004

METERED DISPENSING CONTAINER

Filed Oct. 3, 1966

INVENTOR.
NILES A. KJELSON
BY
L. MeRoy Lillehaugen
ATTORNEY

United States Patent Office 3,377,004
Patented Apr. 9, 1968

3,377,004
METERED DISPENSING CONTAINER
Niles A. Kjelson, Minneapolis, Minn., assignor to General Mills, Inc., a corporation of Delaware
Filed Oct. 3, 1966, Ser. No. 583,530
7 Claims. (Cl. 222—402.2)

ABSTRACT OF THE DISCLOSURE

A pressurized dispensing container which includes a discharge valve at one end, and a collapsible reservoir or bellows within the container operatively connected to the valve, for dispensing the ingredients in metered amounts. By opening the valve, the bellows is emptied; by closing the valve, the bellows is again refilled.

---

This invention relates to pressurized dispensing containers, and more particularly to pressurized containers having a metering or measuring arrangement for dispensing predetermined amounts of the ingredients, such as a fluid product or material, from a container which is pressurized in an appropriate manner.

Pressurized containers are well known in the art for dispensing a wide range of ingredients or products, such as shaving compositions, food compositions, lotions, deodorants, and the like. The product to be dispensed, as well as a suitable propellant gas such as Freon, carbon dioxide, or similar agent, is placed in the container, and appropriate valve means are provided for dispensing the product when desired. In some instances the product is separated from the propellant by appropriate structure such as a barrier, diaphragm, or piston. In other instances, no barriers of any type are provided; as a result, the product to be dispensed, which usually has a geater specific gravity than the propellant, occupies the lower portion of an upright container, while the pressurized gas collects in the space above the product. A dip tube is provided which extends from the valve to the bottom of the container and it conducts the product to the discharge opening when the valve mechanism is actuated.

It is ofttimes desired to dispense the product in predetermined or metered amounts. According to the known state of the art, metering valves or devices are known for dispensing designated amounts of material from a pressurized container. It has been found, however, that devices of the known type have not always been entirely satisfactory. Often the metering arrangement is quite complex because it is formed of a number of separate components or elements; as a result, it is costly to manufacture and quite often it is not accurate and reliable. Furthermore, they are often constructed from types of material which are not appropriate for all uses because the parts may corrode or dissolve when certain products are stored in the container; moreover, the flavor of the product (if a food product for example) is often adversely affected by the type of material used.

Accordingly, one object of the present invention is to provide an improved pressurized dispensing container.

Another object is to provide an improved pressurized container having means for dispensing predetermined or metered amounts of product or material from the container.

A further object is to provide a pressurized dispensing container having an improved metering valve arrangement for dispensing predetermined amounts of product from the container.

Still another object is to provide a metering valve arrangement for use with an aerosol container, which is relatively simple in construction and operation, relatively inexpensive to manufacture, accurate, and long-lasting.

A still further object is to provide an aerosol container having improved dispensing means for discharging metered amounts of material, the container and the dispenser being formed of a material which is unaffected by the nature of the ingredients within the container.

Other objects and advantages of the invention will become apparent from a consideration of the following specification and accompanying drawings. Before proceeding with a detailed description of the invention, a short description of it will be presented.

Briefly, the dispensing container includes a tubular body portion having a bottom end and a top end. A discharge valve mechanism is secured to the top end for dispensing the ingredients from the container. The container is pressurized to a prescribed magnitude with a propellant gas which causes the ingredients to be discharged when the valve is opened. A collapsible bellows is disposed within the container and it is designed to hold a predetermined amount of the product to be discharged. The bellows is formed so that it is normally in an expanded condition, and it is operatively connected to the discharge valve in such a manner that when the discharge valve is opened, the pressure within the container causes the bellows to contract and discharge a predetermined amount of the product from the container.

The invention will best be understood by reference to the following drawings wherein.

Figure 1:
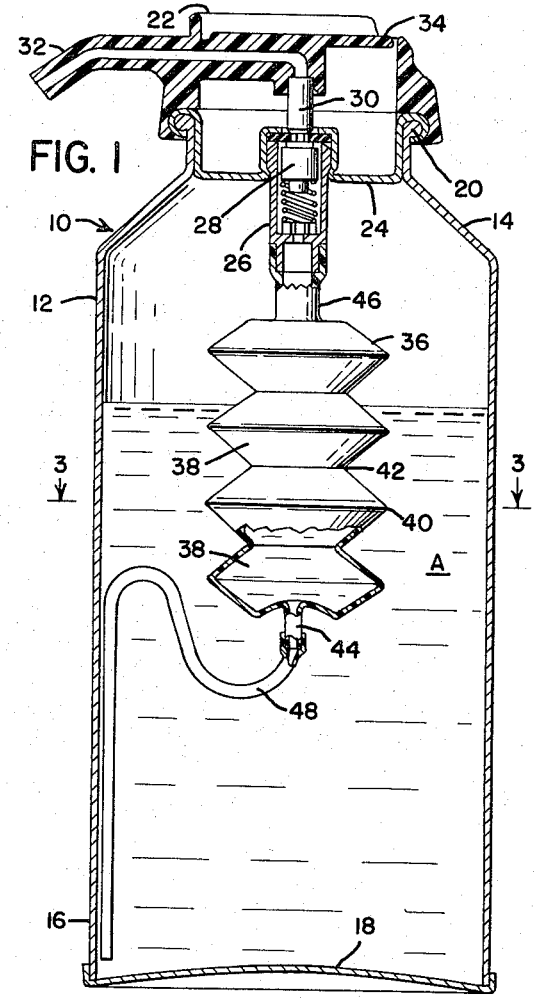
FIGURE 1 is a vertical sectional view of a pressurized dispensing container.

FIGURE 1 illustrates a dispensing container designated generally by reference numeral 10 for containing a fluid material or product A. The container is formed of a cylindrical tubular body 12 having upper and lower ends 14 and 16 respectively. In this regard, it must be realized that while a cylindrical shaped body is preferred, the body may be of some other configuration as well, e.g., conical. A closure member 18 is secured to the bottom end 16 in such a manner that a pressure tight seal is formed. The upper end 14 of the container is shaped to form an opening defined by a rim 20.

A discharge valve mechanism designated generally by reference numeral 22 is connected to the upper end 14 of the container by inserting it in the opening defined by the rim 20. Valve mechanisms of this type are generally well known in the art, and will therefore be described in only limited detail. Generally, the valve mechanism 22 includes a mounting cup 24 which is inserted within the opening 20 and secured to the body 12 in such a manner that a pressure tight seal is formed. A tubular base member 26 is connected to the mounting cup 24, and a valve 28 is positioned within the member 26 so that its tubular valve stem 30 projects through the mounting cup 24. Appropriate seals or gaskets are provided to prevent leakage from within the container. A spout or nozzle 32, having a push button 34, is fastened to the top of the container so that it communicates with the valve stem 30.

A collapsible reservoir or bellows 36 is disposed within the container so that it is proximate the upper end 14 of the container, and it is designed to hold a predetermined amount of the product to be discharged or dispensed. The bellows 36 is formed so that it includes a plurality of flutes or compartments 38 which are connected together to form a somewhat cylindrically shaped reservoir having outer corners or edges 40 and inner corners or edges 42. The bellows is disposed within the container in such a manner that its longitudinal axis is parallel to the longitudinal axis of the container 10. Preferably, the bellows is molded from a flexible plastic material, and it is formed so that it is normally in an expanded condition, as illustrated for example in FIGURE 1. The bellows 36 is adapted to contract or expand along an axis parallel to its longitudinal axis. An inlet port or orifice 44 is provided at the bottom portion of the bellows for admitting ingredients from the container into the bellows, and an exit port 46 is provided at the opposite end of the bellows for discharging the contents therefrom. The bellow 36 is positioned within the container in such a manner that the exit port 46 is attached directly to the base member 26 of the valve mechanism, and a passageway is formed leading from the bellows directly to the valve mechanism. An elongate dip tube 48 is secured to the inlet port 44 by appropriate means, and it extends toward the bottom of the container 10. As noted, the dip tube is provided with a loop which permits the bellows 36 to contract without lifting the end of the tube away from the bottom of the container. The inlet port 44 is designed so that it is substantially smaller in cross-sectional shape than the exit port 46. By appropriately designing and forming the bellows, the exact amount of product contained therein can be controlled; in other words the bellows can be made to hold a predetermined amount of the product, such as one ounce, one teaspoonful, or the like. It might be pointed out, that while the bellows 36 is shown as being attached directly to the valve mechanism, it might just as readily be positioned near the bottom of the container, and a dip tube could be provided for connecting the exit port 46 to the valve mechanism.

As shown in FIGURE 1, the container 10 is partially filled with the fluid product A, such as a fruit juice concentrate, which might contain strong acid components. It has been found that by constructing the bellows 36, the dip tube 40, as well as the container itself, or at least lining the container, of a material such as plastic, the container can be used for containing ingredients or products which might cause other types of material such as metal or rubber to corrode, dissolve, or give an off-flavor to the product dispensed. If desired, the product can be admitted into the container before the bellows 36 is admitted thereinto and the valve mechanism 22 secured to the top of the container; it might be admitted through an opening in the bottom or wall of the container which is sealed shut after the container is filled; or it might be admitted after the construction of the container has been completed by forcing it through the valve mechanism, in a manner well known in the art. After the fluid product has been admitted into the container, the container is preferably pressurized to a prescribed maximum with a suitable propellant gas such as carbon dioxide, nitrous oxide, Freon, butane, or other agent. In this regard, it should be recognized that a liquid propellant, such as liquid Freon, might be used as the propellant as well. In such instances, care should be taken to make sure that the liquid propellant is properly dispersed throughout the contents of the container, by shaking the container before use, for example. The type of propellant used will depend on the type of product to be contained, the amount of pressure desired, and the like. In some instances for example, a pressure of 50–100 p.s.i., and preferably about 90 p.s.i., might be used; while in other instances lower pressures might suffice.

As the container becomes pressurized, the fluid product flows into the expanded bellows 36 through the dip tube 48 and the inlet port 44, until the bellows is substantially filled, and the pressure both inside and outside the bellows is substantially the same. It should be pointed out that the bellows may not be completely filled with the product initially, because a small reservoir or pocket of air may be trapped therein which prevents complete filling. In other words, as the bellows becomes filled from the bottom, the pressure of the air within the bellows and dip tube 42 increases until it is equal to or greater than the pressure within the can. After the valve 22 has once been actuated however, and the contents within the bellows dispensed, the bellows and dip tube will become filled thereafter. As pointed out hereinbefore, the bellows is formed so that it is normally in an expanded condition; therefore, it readily fills regardless of the internal pressure of the container or bellows. At this point, the dispensing container is ready for use.

Figure 2:
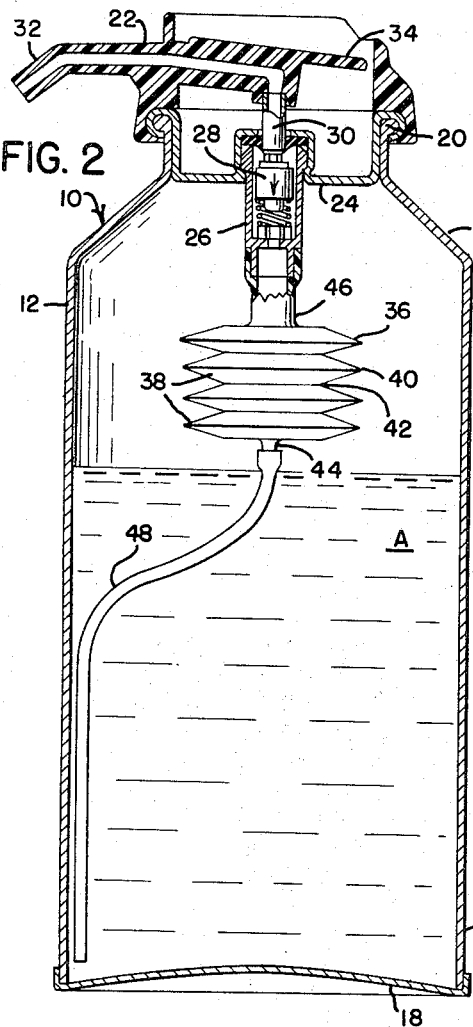
FIG. 2 shows the container of FIGURE 1 in a different operating condition.
Figure 3:
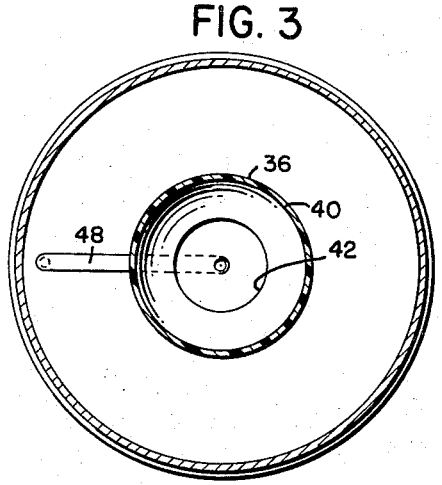
FIG. 3 is a sectional view taken along line 3—3 of FIGURE 1.

FIG. 2 illustrates the container 10 after the valve mechanism 22 has been actuated and a metered amount of the container ingredients dispensed. By depressing the push button 34, the valve 28 is opened; the pressure within the container causes the bellows 36 to contract thus forcing the product out of the bellows 36 through the exit port 46, and through the spout 32, thereby discharging a predetermined amount of the product from the container. When the valve 28 is again closed, the bellows 36 extends and the fluid product again flows into the bellows. It should be pointed out that while the product within the bellows is being discharged through the exit port 46, a small amount of the product might begin to flow into the bellows through the dip tube 48 and the inlet orifice 44. By forming the exit port 46 so that it is somewhat larger in cross-sectional shape than the orifice 44 and the dip tube 48, the bellows will be discharged substantially faster than the product flows thereinto. Since the pressure within the container is quite high, the contents of the bellows are discharged quite rapidly. If desired of course, appropriate valves might also be used to completely cut off the flow into the bellows while the bellows is being contracted and while it is in a collapsed condition.

Figure 4:
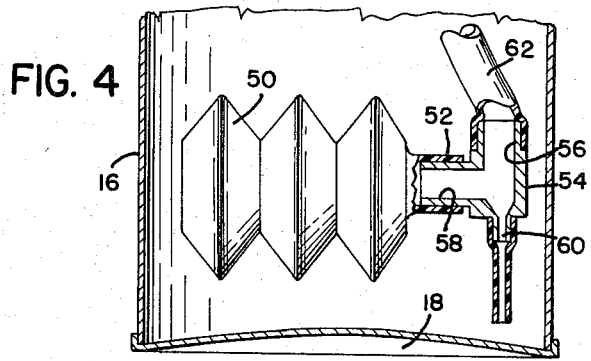
FIG. 4 illustrates another embodiment of the invention.

FIG. 4 illustrates another embodiment of the invention which is quite similar to that shown in FIGS. 1 and 2, in that a bellows similar to that described in conjunction with these figures is used. In this embodiment however, the bellows 50 is disposed within the container proximate the lower end 16 of the container, and its longitudinal axis is perpendicular to the longitudinal axis of the container. In this embodiment, only a single inlet and exit port 52 is provided, and it is connected to a T-coupling 54 having three ends 56, 58 and 60, by appropriate means. A dip tube 62 operatively connects the coupling 54 to a valve mechanism (similar to that shown in FIG. 1) and it provides a passageway for the material to flow from the bellows to the valve mechanism. Note that end 60 of the coupling 54 is smaller in cross-section than the ends 56 and 58. This acts to restrict the flow of material into the bellows 50 from the container.

In operation, when the valve is actuated and opened, the pressure within the container causes the bellows 50 to contract along its longitudinal axis, thereby causing the fluid product contained therein to flow through the coupling 54, the dip tube 62 and out through the valve mechanism. When the valve is again closed, the bellows 50 expands and the product again fills the bellows for additional dispensing.

It has been found that in most instances the bellows discharges its contents so quickly that the amount of product which flows into the bellows through the inlet orifice is negligible or not critical. If desired however, means might be provided for substantially blocking the inlet while the contents are being discharged; for example, an appropriate valve mechanism might be provided in lieu of the coupling 54 which could control the flow of material into or out of the bellows 50, and dip tube 62.

In the above description and attached drawings, a disclosure of the principles of this invention is presented, together with some of the embodiments by which the invention may be carried out.

Now therefore, I claim:
1. A container for dispensing predetermined amounts of a pressurized product comprising a tubular body having first and second closed ends, said container being pressurized to a prescribed magnitude, valve means for permitting said product to be discharged therefrom, a collapsible bellows within the tubular body for holding a predetermined amount of said product, said bellows being formed so that it is normally in an expanded condition, said bellows being readily contractable, an inlet opening for admitting said product into the bellows, means for connecting said bellows to the valve means in such a manner that a passageway is formed therebetween, said passageway forming a separate outlet opening for discharging said product from the bellows, the pressure within the container being sufficient to cause the bellows to collapse when the valve means is opened, thereby discharging the contents of the bellows through the outlet opening and the valve mechanism, and means for restricting the amount of product which can flow into the bellows through the inlet opening when said bellows contracts and discharges the product therefrom.

2. The combination of claim 1 wherein the bellows has two ends, said inlet opening being at one end and said outlet opening being at the other end, said inlet opening being substantially smaller than the opening of the passageway between the bellows and the valve means.

3. The combination of claim 2 wherein means are provided for attaching the bellows directly to the valve means, and an elongate dip tube is attached to the inlet opening in such a manner that it extends away from said valve means.

4. The combination of claim 1 wherein the bellows inlet opening is substantially smaller than the opening of the passageway between the bellows and the valve means, and the bellows is disposed within the container so that its longitudinal axis is perpendicular to the longitudinal axis of the container and it contracts and expands along said longitudinal axis.

5. The combination of claim 4 wherein the valve means is attached to one end of the container, the bellows is cylindrically shaped and it is positioned within the container proximate the other end of the container, a T-coupling is provided, and an elongate dip tube is provided for connecting the bellows to the valve means thereby providing a passage from the bellows to the valve means, said dip tube and said bellows being attached to said T-coupling.

6. The combination of claim 5 wherein said T-coupling includes three ends, one of said ends being smaller in size than the other two and forming an inlet, said bellows and said dip tube being attached to said other two ends of said coupling.

7. A container for dispensing predetermined amounts of a pressurized product comprising a tubular body having first and second closed ends, said container being pressurized to a prescribed magnitude, valve means for permitting said product to be discharged therefrom, said valve means being attached to one end of the container and being provided with a tubular base member, collapsible reservoir means within the tubular body for holding a predetermined amount of said product, said reservoir means being comprised of a collapsible bellows which is formed so that it is normally in an expanded condition, but which will be readily contracted, said bellows being cylindrically shaped and being positioned proximate said valve means, inlet means for admitting said product into the reservoir, an elongate dip tube attached to the inlet means of said bellows in such a manner that it extends toward the opposite end of the container, and means for connecting said reservoir to the base member of said valve means in such a manner that a passageway is formed therebetween, the bellows inlet means being provided with an opening which is substantially smaller than the opening of the passageway between the bellows and the valve means, said bellows being disposed within the container so that its longitudinal axis is parallel to the longitudinal axis of the container and it contracts and expands along said longitudinal axis, the pressure within the container being sufficient to cause the reservoir to collapse when the valve means is opened, thereby discharging the contents of the reservoir through the valve mechanism.

References Cited

UNITED STATES PATENTS

| | | | |
|---|---|---|---|
| 2,728,495 | 12/1955 | Eaton | 222—402.25 X |
| 2,849,323 | 8/1958 | Young | 222—394 X |
| 3,072,487 | 1/1963 | Webster | 222—394 X |
| 3,104,785 | 9/1963 | Beard | 222—402.2 X |
| 3,124,275 | 3/1964 | Lake | 222—207 |
| 3,235,135 | 2/1966 | Robert et al. | 222—402.2 X |

SAMUEL F. COLEMAN, *Primary Examiner.*